(12) United States Patent
Adnan et al.

(10) Patent No.: US 11,940,983 B1
(45) Date of Patent: Mar. 26, 2024

(54) ANOMALY BACK-TESTING

(71) Applicant: Amazon Technologies, Inc., Seattle, WA (US)

(72) Inventors: Mohammad Adnan, Kent, WA (US); Mohammed Talal Yassar Azam, Snoqualmie, WA (US); Aditya Bahuguna, Seattle, WA (US); Fnu Syed Furqhan Ulla, Redmond, WA (US); Devesh Ratho, Seattle, WA (US); Ankita Verma, San Francisco, CA (US); Ankur Mehrotra, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 189 days.

(21) Appl. No.: 17/491,486

(22) Filed: Sep. 30, 2021

(51) Int. Cl.
*G06F 16/23* (2019.01)
*G06N 20/20* (2019.01)

(52) U.S. Cl.
CPC ......... *G06F 16/2365* (2019.01); *G06N 20/20* (2019.01)

(58) Field of Classification Search
None
See application file for complete search history.

(56) References Cited

U.S. PATENT DOCUMENTS

| | | | | |
|---|---|---|---|---|
| 11,726,982 B1* | 8/2023 | Azam | ................. | G06F 16/2365 707/690 |
| 11,770,398 B1* | 9/2023 | Erlingsson | ............ | G06F 16/986 709/224 |
| 11,797,515 B2* | 10/2023 | Goel | ................... | G06F 16/2365 |
| 11,797,565 B2* | 10/2023 | Bui | ..................... | G06F 16/2365 |
| 2021/0110407 A1* | 4/2021 | Albero | ............. | G06Q 30/0185 |
| 2022/0092612 A1* | 3/2022 | Bharath | ............ | G06Q 30/0201 |
| 2022/0236707 A1* | 7/2022 | Rangarajan | ............ | G06Q 50/02 |
| 2022/0299995 A1* | 9/2022 | Ganapathi | ............ | G06Q 10/087 |
| 2023/0237380 A1* | 7/2023 | Vodencarevic | .......... | G06N 5/01 706/12 |
| 2023/0252477 A1* | 8/2023 | Juneja | .................... | G06Q 40/03 705/39 |
| 2023/0267368 A1* | 8/2023 | Paulitsch | ........... | G05B 23/0254 706/12 |
| 2023/0281186 A1* | 9/2023 | Yuan | ................... | G06F 16/2365 707/691 |
| 2023/0297453 A1* | 9/2023 | Viclizki | .................. | G06N 5/04 714/47.2 |

\* cited by examiner

*Primary Examiner* — Kim T Nguyen
(74) *Attorney, Agent, or Firm* — Davis Wright Tremaine LLP (57) ABSTRACT

A service to provide anomaly detection receives a request to back-test the service. The request includes information for accessing a dataset of historical data. The service executes workflows to ingest the data, train a plurality of machine learning models to perform anomaly detection, and detect anomalies in the dataset. A representation of the detect anomalies is generated and presented to a user. The service receives an indication to activate the service to provide ongoing anomaly detection services.

20 Claims, 7 Drawing Sheets

ANOMALY BACK-TESTING

BACKGROUND

Machine learning is an evolving field that is increasingly used in a wide variety of applications. New machine learning techniques continue to be developed. Although these techniques have improved capabilities for making accurate and useful predictions, they remain difficult to use, in part because they tend to require extensive knowledge and experience.

BRIEF DESCRIPTION OF THE DRAWINGS

Various techniques will be described with reference to the drawings, in which.

DETAILED DESCRIPTION

In an example, an anomaly detection service includes a capability for back-testing the service. The back-testing allows a potential user of the service to evaluate the efficacy of the service, including algorithms and techniques used by the service to select, train, and utilize machine learning models.

The example system may receive a request to configure a service to provide anomaly detection. The request can include information indicating that back-testing should be performed, and indicate a dataset of historical data. In some cases, the request may include the historical data, while in others the request can provide information allowing the service to upload and ingest the data.

The example system then executes one or more workflows to perform the back-testing. Certain of these workflows, or operations within the workflows, may be executed in parallel in order to reduce the time needed to obtain back-testing results. The workflows upload the dataset of historical data and begin training a plurality of machine learning models. The models can include one that detects anomalies within a time series of data. This model, once trained, is used by the service to identify and explain anomalies detected in the provided dataset of historical data. A first portion of the dataset is used for training, and a second portion for identifying anomalies. A model of this type is be employed by the service, subsequent to its training, to generate inferences related to the presence of an anomaly. This can be done within the same workflow, in order to eliminate the need to reload the machine learning model.

The machine leaning models also include at least one that performs correlation, sometimes referred to as a grouping and ranking, between various anomalies or between anomalies and other data included in the dataset. The machine learning models may be trained to perform grouping, ranking, correlation, and/or causality analysis based on the output of the models that identify anomalies in individual time series. Once trained, the service uses the grouping and ranking model to identify correlations between the detected anomalies and generate potential explanations that can be conveyed to the user as part of the results of back-testing.

The example system may then generate a report or other representation of the results, and present them to the user who requested the back-testing. If the user approves of the results, the system might then proceed to activate workflows to perform anomaly detection on an ongoing, or continuous, basis.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Figure 1:
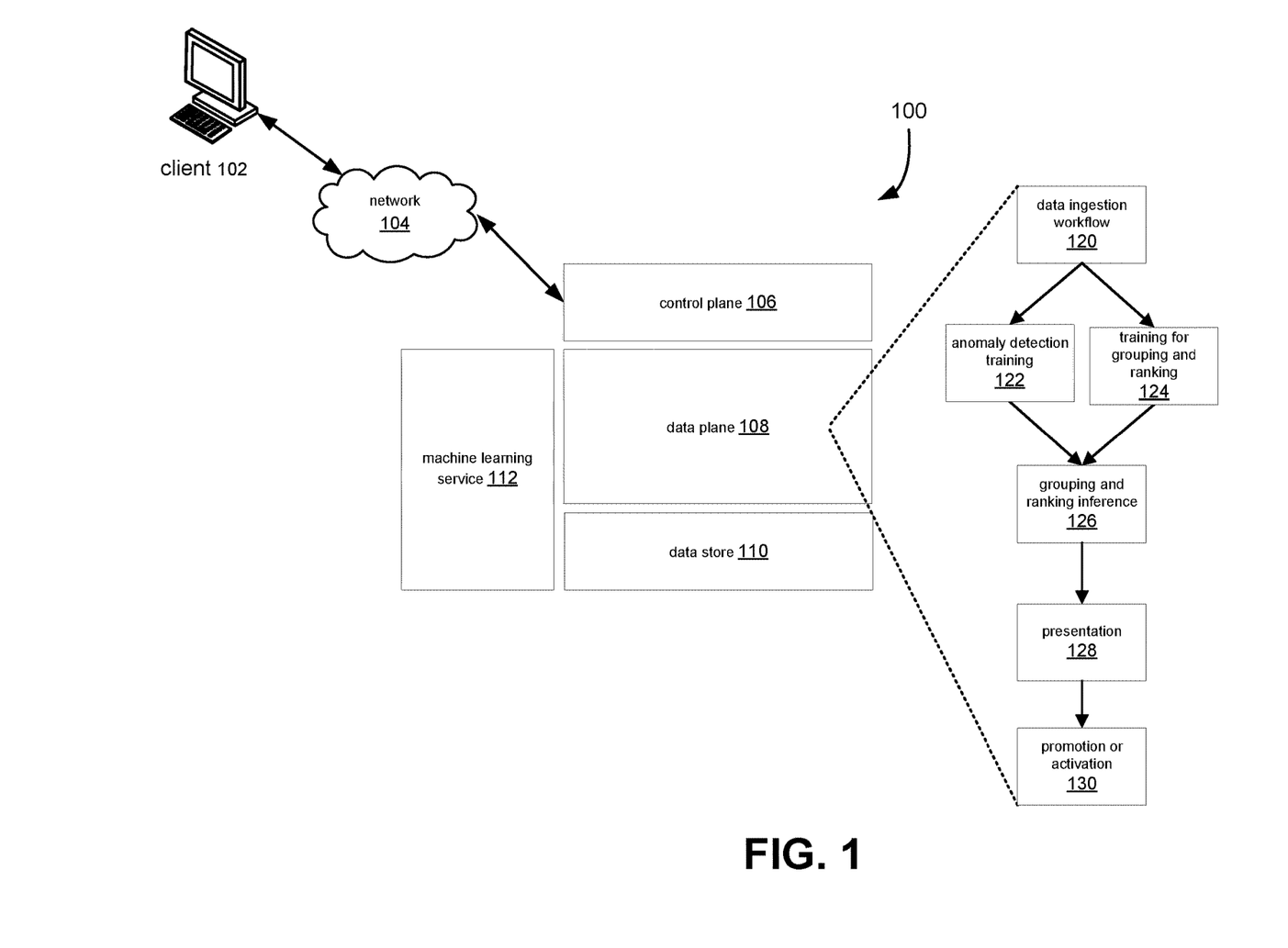
FIG. 1 illustrates an example of an anomaly detection system with integrated back-testing, in accordance with an embodiment.

FIG. 1 illustrates an example of an anomaly detection system with integrated back-testing, in accordance with an embodiment. In the example system 100 of FIG. 1, an anomaly detection service provides services to automatically generate and apply artificial intelligence and machine learning techniques to supplied data in order to detect anomalies in the data. An anomaly, which may sometimes be referred to as an outlier, is a portion of a time series that exhibits an interesting, unusual, atypical, or useful trend, pattern, or value. For example, if a time series represents the number of units of a product sold over time, a period in which the units sold were considerably higher than the average might be considered an anomaly, or outlier. Such patterns can be difficult to detect, particularly because some variations, such as those that occur seasonally or on different times of the week, may be considered normal. Artificial intelligence and machine learning may be used to detect anomalies, but tend to require considerable expertise. However, as described herein, an anomaly detection service can insulate the user from the need to acquire such expertise, by operating in a manner which allows the user to simply provide data and other basic information outlining the user's requirements for predictions, without providing technical details relating to the underlying implementation of a machine learning model. One drawback to such an approach, on the other hand, is that the user may not feel confident that the service will provide accurate, reliable, or useful predictions. To address these needs, the system 100, and other embodiments described herein, include back-testing capabilities that help demonstrate to the user that the service's capabilities for selecting, generating, and operating the underlying machine learning models will provide useful data when enabled for real-time operation.

In the example system 100, a client 102 may request that prediction services be provided by transmitting such as request to the system 100 via a network 104. In some cases, this comprises the user interactive with a web-based console application provided by the system 100.

The system 100 may comprise a control plane 106, data plane 108, and data store 110. In at least one embodiment, the control plane 106 performs management functions and controls data flow between the various components of the system 100 and the client 102. The data plane 108 implements procedures, functions, or services related to execution of workflows. A data store 110 provides access to systems and services for storing and retrieving data. A variety of such systems or services can be employed, potentially including but not necessarily limited to relational data stores, file-based data stores, data lakes, data warehouses, and so on.

Workflows to enable prediction services with automated back-testing may be executed by data plane 108. In at least one embodiment, the workflows may comprise a data ingestion workflow 120, a workflow 122 for anomaly detection training, a workflow 124 for grouping and ranking training, a workflow for grouping and ranking inference 126, a presentation workflow 128, and an activation or promotion workflow 130.

The data ingestion workflow 120 manages intake of data for back-testing. In some cases, significant amounts of data may be involved. The data ingestion workflow 124, in at least one embodiment, establish communications capabilities between the client 102 and system 100 to receive uploaded historical data, and causes the data to be stored and, when sufficient quantities or correct units of the data are available, to be made available to subsequent workflows.

The anomaly detection training workflow 122 performs operations to train one or more machine learning models to perform anomaly detection on input time series. This may sometimes be referred to as point detection, outlier detection, and so forth. The system may automatically select an appropriate type of machine learning model based on analysis of a pattern exhibited in the time series, and train the model without input from the user other than the data and other basic information, such as the desired frequency prediction. The workflow 122 may use a subset of a provided time series for training, such as 70% of the data points in a time series, and reserve 30% for performing inference and identifying anomalies. In some cases and embodiments, the inferencing stage can be performed directly subsequent to the training stage, as part of the training workflow. This reduces the need to perform a separate operation on the data plane 108.

The ranking and grouping training workflow 124 may be executed in parallel with the anomaly detection training workflow, although in cases and embodiments some portions of its execution may rely on at least some output from the machine learning models created by the anomaly detection workflow 122. The ranking and grouping training workflow 124 trains a machine learning model to identify and generate anomaly groups. These include information indicating causality and contributions for the time series. For example, an anomaly group might include an identification of an anomalous portion of a time series, a ranking or confidence metric for the anomaly, information about other time series or data that might be correlated to or causative of the anomaly, and ranking or confidence metrics for these potential explanations of the anomaly.

The grouping and ranking inference workflow 126 uses the model created by workflow 124 to identify and generate anomaly groups. The presentation workflow 128 then assembles information from the anomaly groups into a format suitable for presentation to the user.

The promotion or activation workflow 130, in at least one embodiment, receives input from the client 102 indicating whether the back-testing results are acceptable, and if so causes continuous anomaly detection to begin. This could include accepting additional input regarding how the continuous anomaly detection should proceed, for example by changing the prediction frequency, changing the configuration of the data source, changing the format or destination of alerts to be generated when an anomaly is detected, and so forth.

As used herein, activation of continuous anomaly detection refers to causing continuous anomaly detection to proceed by performing steps similar to those performed by the prior workflows 120-128, but with respect to continuous data. In the case of activation (as opposed to promotion), new anomaly detection machine learning models and grouping and ranking machine learning models are created. With promotion, in contrast, the machine learning models generated during back-testing are used to perform the subsequent continuous anomaly detection.

In at least one embodiment, the example system 100 comprises a machine learning service 112. The machine learning service 112 provides capabilities for generating, training, or using various machine learning algorithms and models. These could include, but are not necessarily limited to, neural networks, decision trees, random forests, support vector machines, and so on. The workflows 120-128 may use the machine learning service 112 to generate, train, and use the respective models created by those workflows.

Figure 2:
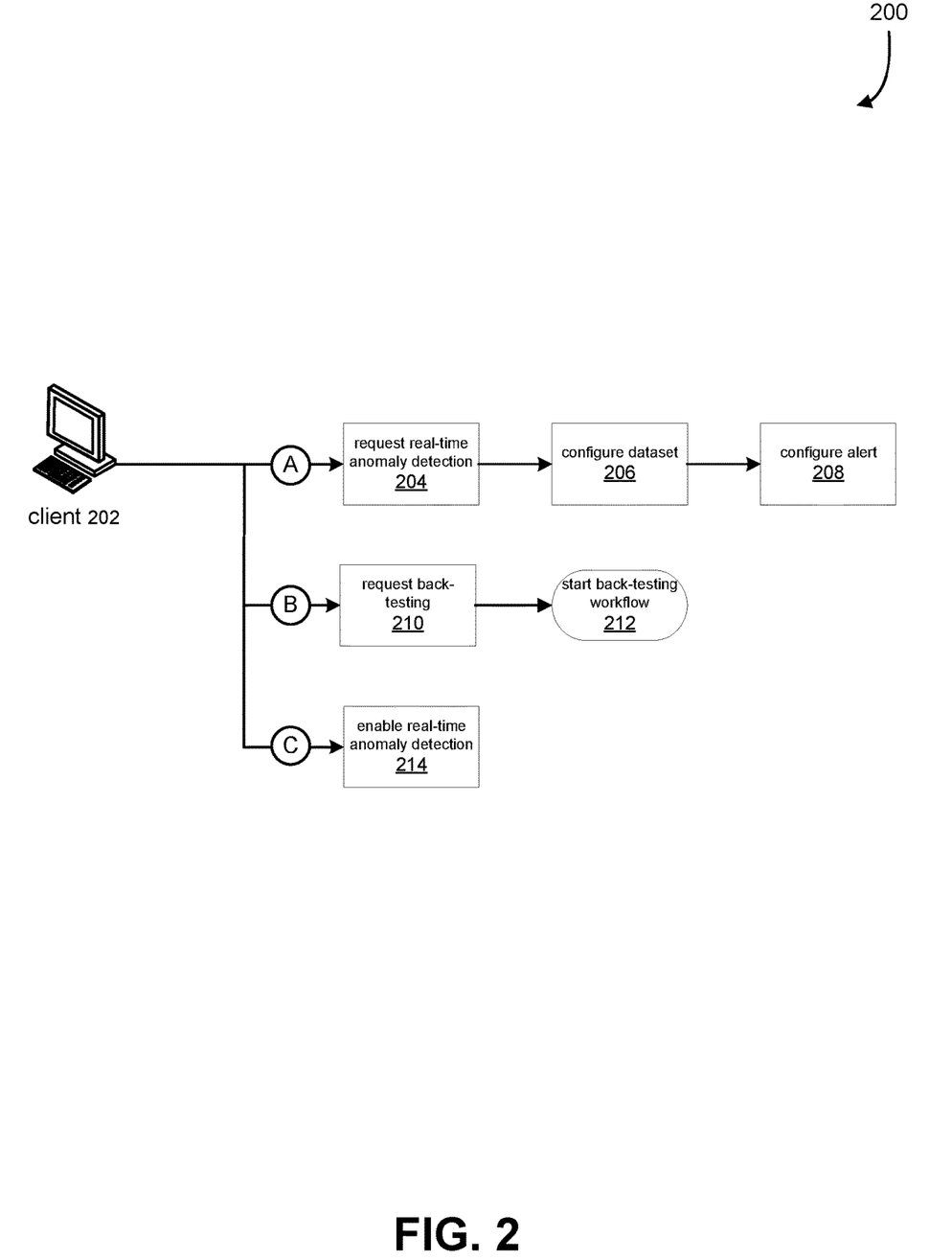
FIG. 2 illustrates an example of anomaly detection back-testing and activation, in accordance with an embodiment.

FIG. 2 illustrates an example of anomaly detection back-testing and activation, in accordance with an embodiment. Note that although the example 200 of FIG. 2 is depicted as a series of steps or operations, it will be appreciated that embodiments of the depicted procedure may include altered or reordered steps or operations, or may omit certain steps or operations, except where explicitly noted or logically required, such as when the output of one step or operation is used as input for another.

In the example 200, a client 202 may interact with an application programming interface ("API") or user interface to request the provision of anomaly detection services. These services, while based on artificial intelligence and machine learning techniques, are in embodiments implemented so that the consumer of the services is isolated from, and does not need to be aware of, the underlying artificial intelligence and machine learning techniques that might be employed. This approach both simplifies the user experience and allows the service provider to make more flexible use of different techniques. However, it may be helpful for the user to be assured that the techniques that are to be employed for selecting, training, and using the underlying artificial intelligence and machine learning models are suitable for their needs. Accordingly, the service provider, as depicted in the example 200, provides a back-testing capability. This allows the user to use historical data to evaluate the service and, if satisfied with the results, leverage the service with real-time data.

Further, it may be desirable for the user's interactions with the service, while setting up back-testing, to be similar to the user's interactions with the service while requesting anomaly detection for real-time data.

As depicted by element 204 of the example 200, a client 202 may request that an anomaly detection service perform real-time anomaly detection on the client's behalf. The parameters provided by the client 202 at this stage may be limited to include only basic requirements for the predictions, such as the prediction frequency, and exclude details related to any of the underlying artificial intelligence or machine learning techniques that might be employed by the service. Prediction frequency refers to the granularity of the predictions being requested, such as per-hour, per-day, or per-week, for example.

The client 202 may further provide details to allow for configuration of the dataset, or data source, that is to be used to make predictions. In the case of real-time data, this can include providing a dataset and any metadata, or other related information, needed for the service to interpret the data provided. The anomaly detection service can then use the dataset to construct a set of machine learning models that can be used to identify anomalies. Similarly, in the case of back-testing, the client can simply provide a dataset of historical data, along with any metadata and related information needed to allow the service to interpret the historical data.

As depicted by element 208, the client 202 can also provide the anomaly detection service with information to configure the alerts that the system will generate. This can include providing information n about how the alerts should be communicated to the client 202, what format the alerts should take, and so on. For performing back-testing, the same alert configuration can be used. Note, however, that for back-testing the anomaly detection system may adapt the format and frequency of the alerts to be more suitable for the purpose of back-testing. For example, the anomaly detection service might generate batches of alerts, summaries of alerts, or otherwise present alerts in a format that is suitable for evaluating the reliability, accuracy, or usefulness of the anomaly detection service.

The example 100 shows that a client 202 may first perform a set of operations, marked as (A) in FIG. 2, to configure an anomaly detection service. As depicted by the set of operations marked as (B), the client 202 may also request back-testing, as indicated by element 210. In some cases and embodiments, this may follow, or be followed by, the client proceeding with the set of operations marked (A). The process of requesting back-testing may therefore, in some embodiments, involve following steps similar to those used for setting up real-time predictions, or in other embodiments in may be an adjunct to the process of setting up real-time predictions. For example, in at least one embodiment, back-testing is enabled by providing a set of historical data and setting a flag or other indicator requesting that back-testing be performed, in addition to performing operations to set up real-time anomaly detection.

In response to a request for back-testing, the anomaly detection service may, at (B), initiate a back-testing workflow, as depicted in FIG. 2 by element 212. Embodiment of back-testing workflows are described in more detail herein, including with respect to FIG. 3. If the back-testing workflow generates results that are acceptable to the client 202, the client may, at (C), initiate real-time anomaly detection, as depicted by element 214.

The user may review the results of back-testing to verify that the anomaly detection service will provide accurate and reliable results. Assuming this is the case, the user may then determine to use the anomaly detection service, using the configuration established in the preceding steps. In some cases and embodiments, this involves promoting the models created for use in back-testing to use with real-time data. In other cases and embodiments, it involves relying on the same algorithms used to create the models used in back-testing, but with new data.

Figure 3:
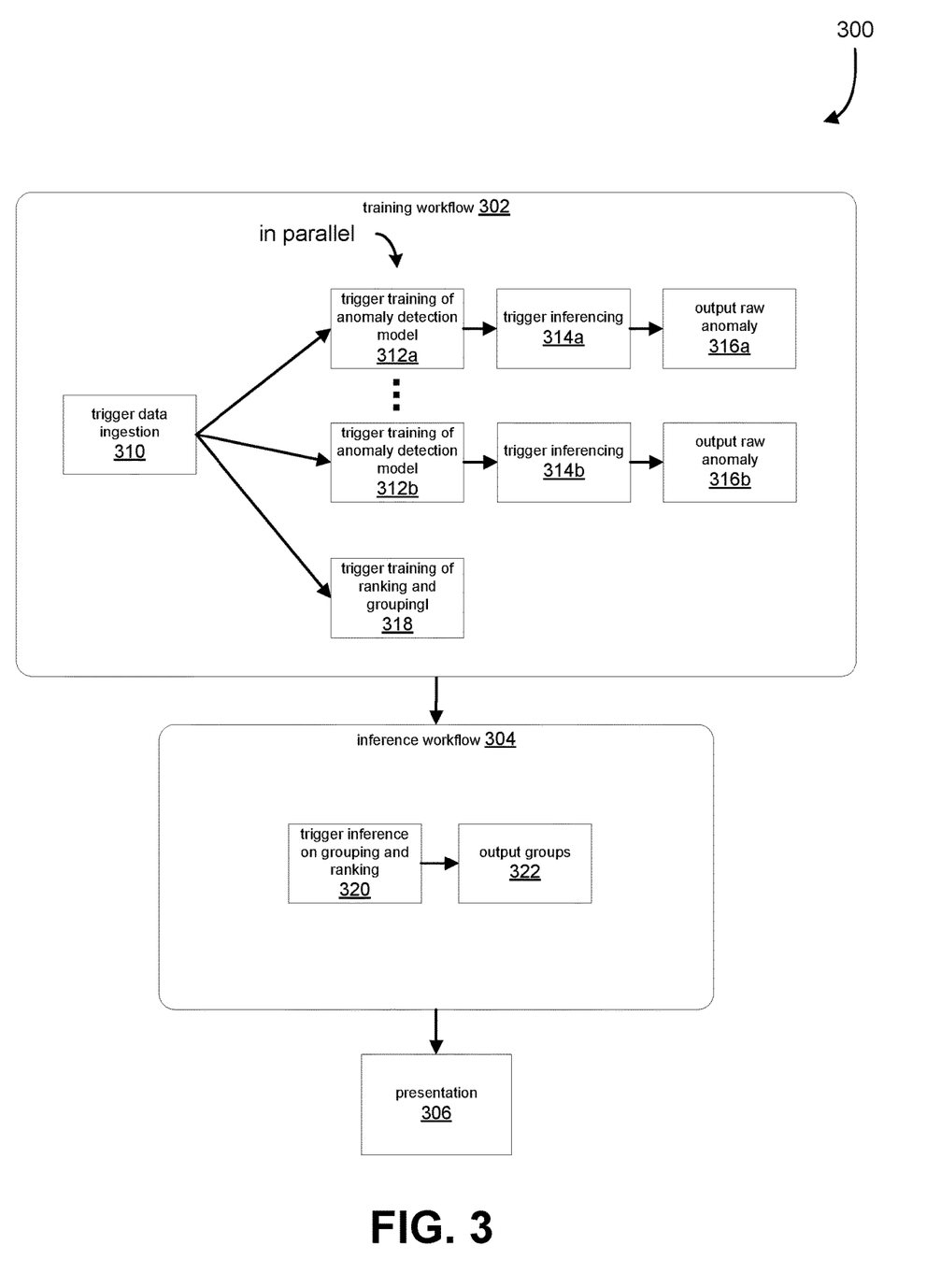
FIG. 3 illustrates an example of a back-testing workflow, in accordance with an embodiment.

FIG. 3 illustrates an example of a back-testing workflow, in accordance with an embodiment. Note that although the example 300 of FIG. 3 is depicted as a series of steps or operations, it will be appreciated that embodiments of the depicted procedure may include altered or reordered steps or operations, or may omit certain steps or operations, except where explicitly noted or logically required, such as when the output of one step or operation is used as input for another.

In at least one embodiment, a back-testing procedure for an anomaly detection service comprises a training workflow 302, inference workflow 304, and presentation workflow 306. These workflows 302-306 may be combined into a single back-testing workflow, and executed as a sequence of sub-workflows within that context.

The training workflow 302 includes an operation to trigger data ingestion 310. Here, ingestion refers to the system intaking one or more time series from the source or sources specified when the dataset was configured. The time series represents the historical data to be used to back-test the anomaly detection system.

After data ingestion 310, the training workflow 302 proceeds to train a set of machine learning models. The training of the models may be performed in parallel. For example, an operation 312*a* may be performed to train a first predictive model, followed by an inferencing operation 314*a* and an operation 316*a* to output raw anomaly data obtained by the inferencing from this model. In cases and embodiments, more than one predictive model might be generated, and these might also be trained in parallel, as depicted in FIG. 3 by operations 312*b*-316*b*. The system may also, in parallel, perform an operation 318 to trigger training of a ranking and grouping model.

The ranking and grouping model, is trained to generate a contribution matrix and perform causality analysis. Whereas the predictive models identify anomalous points in time series, the ranking and grouping model, in at least one embodiment, outputs rankings of the anomalies, identifies relationships between anomalies or other events identified in the dataset, and so forth.

The inference workflow 304 performs steps to obtain inferences from the trained ranking and grouping model. Accordingly, at 320, the inference workflow 304 triggers inferencing by the grouping and ranking model. At 322, the inference workflow 304 outputs groups.

At 306, the back-testing workflow 300 triggers alerting on the grouping and ranking information generated by the inference workflow 304. This can comprise generating, or causing to be generated, a display of the information on a dashboard or other user interface. In at least one embodiment, the output is generated to be similar to what would be produced during real-time anomaly detection, in order to enable the user to evaluate the efficacy of the anomaly detection system, in view of the results of back-testing.

Figure 4:
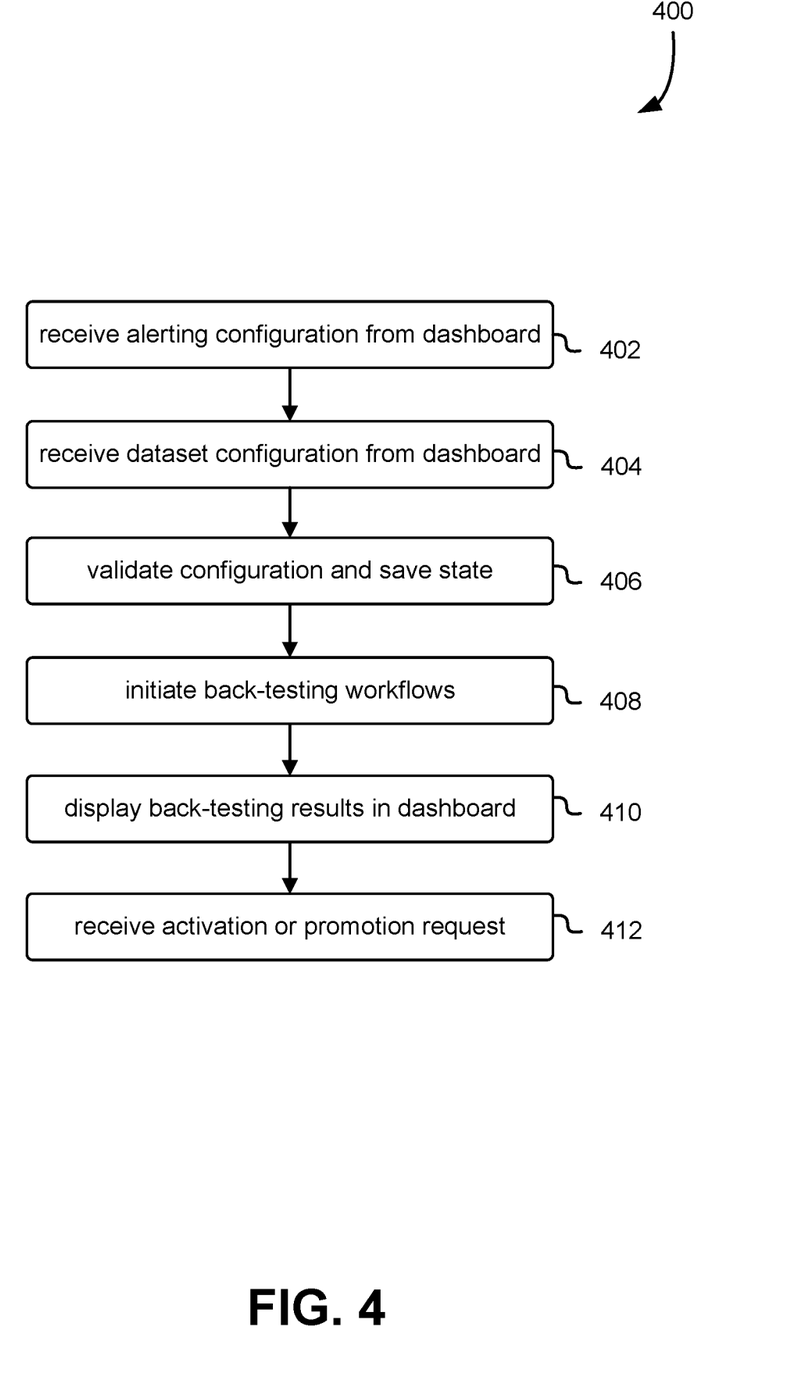
FIG. 4 illustrates an example procedure for managing client interaction for back-testing an anomaly detection system.

FIG. 4 illustrates an example procedure for managing client interaction for back-testing an anomaly detection system. Although the example 400 of FIG. 4 is depicted as a series of steps or operations, it will be appreciated that embodiments of the depicted procedure may include altered or reordered steps or operations, or may omit certain steps or operations, except where explicitly noted or logically required, such as when the output of one step or operation is used as input for another.

At 402, the anomaly detection system receives alerting configuration from a dashboard. This can include information about the desired format for alerts, the granularity or frequency of the alerts (such as hourly, daily, or weekly), and so on. In some cases, the dashboard is similar, or identical, to what would be used to configure continuous anomaly detection.

At 404, the anomaly detection system receives a dataset configuration from a dashboard. This includes information such as where the data in the dataset is located, what the format of the dataset is, and so on. The information should be sufficient for upload of the data to commence either immediately or once back-testing is started and the data ingestion process begins. Depending on the size of the dataset, the data may be uploaded synchronously by the user interface, or asynchronously at a later stage, such as by a data ingestion workflow.

At 406, the anomaly detection system validates the configuration and saves state information needed to begin workflows for back-testing. This may, in at least one embodiment, be done via a control and data plane, as depicted in FIG. 1.

At 408, the anomaly detection system initiates the back-testing workflows. This may be done according to any of the various embodiments described herein, including for example those embodiments described in relation to the various figures.

At 410, the anomaly detection system displays results of back-testing in a dashboard. Th dashboard display can be generated to include summary or detail information about the various anomalies detected during back testing. The output may be generated to be similar to what would be produced during real-time anomaly detection, in order to enable the user to evaluate the efficacy of the anomaly detection system and better understand what kinds of results could be anticipated when continuous anomaly detection is enabled.

At 412, the anomaly detection system receives an activation or promotion request. This may be initiated through the dashboard. Some embodiments may provide a choice between activation or promotion, while others may support only one option. In some systems, activation of continuous anomaly detection causes the system to repeat the various ingestion and training workflows described herein, except using real-time or continuous data sources, or data provided on a periodic or ongoing basis, rather than historical data. If promotion is used, the models trained during back-testing may be used, rather than recreating entirely new models. In either case, the system may support subsequent retraining of the models based on more recent data, using essentially the same algorithms that were used for back-testing. In general, there would be few significant differences between the algorithms, except perhaps for the data ingestion phase and potentially different alerting formats or mechanisms.

Figure 5:
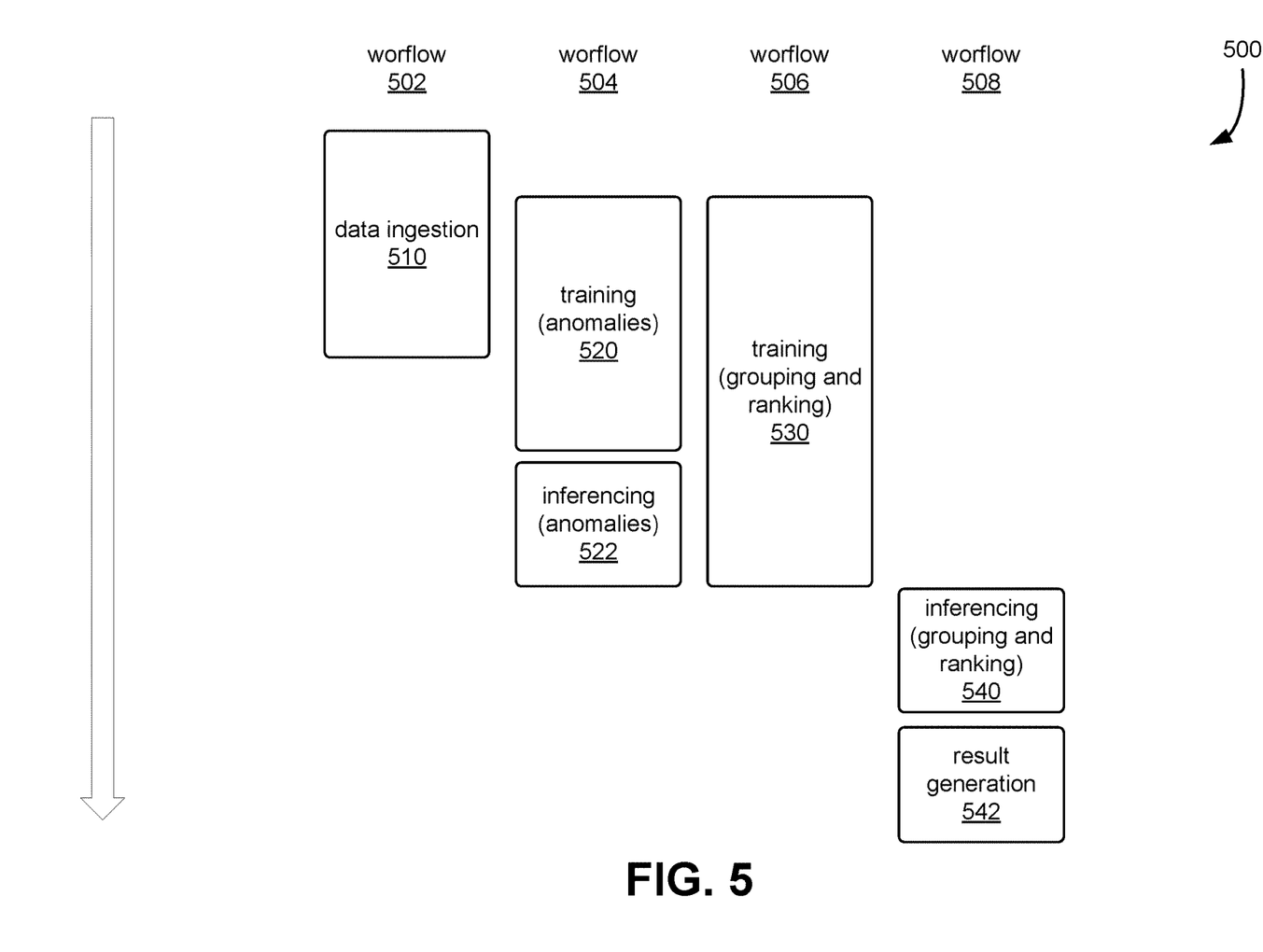
FIG. 5 illustrates an example of parallel workflow execution for back-testing an anomaly detection service, in accordance with an embodiment.

FIG. 5 illustrates an example of parallel workflow execution for back-testing an anomaly detection service, in accordance with an embodiment. As depicted in the example 500, embodiments may employ parallelism to improve the responsiveness of the back-testing procedure. These improvements may be beneficial due to the amount of data involved in back-testing and the relatively lengthy times sometimes required to train machine learning models.

In the example 500, an anomaly detection service performs back-testing by initiating a set of workflows 502-508, some of which operate in parallel. Note that here, parallelism does not require that the workflows perform entirely independently of other workflows, as there may be some data dependencies between the various workflows that cause progress on one workflow to be paused while waiting for another workflow to catch up.

The anomaly detection service may initiate a workflow 502 to perform data ingestion 510. This may comprise upload of time series or other data from a client, or some other means of acquiring the dataset configured by the client. The data may, for example, be uploaded from the client (or from some other source specified by the client) and stored in a data storage service. In at least one embodiment, a control plane and/or data plane executes the workflows 502-508.

In at least one embodiment, a workflow 504 can be executed to perform operations 520 to train a machine learning model to detect anomalies in time series. The workflow 504 can be executed in parallel to the workflow 502 that is performing data ingestion 510, although some embodiments may (as depicted in FIG. 5) defer the start of the training operations 520 until at least some of the data to be used by the training has been obtained. For example, the data ingestion operation 510 may upload data in segments compatible with the training operation. This could include uploading each time series in the dataset as discrete units, so that a machine learning model to detect anomalies in that time series may begin training before other time series are uploaded. Similar, the data ingestion operation 510 may upload data within a time series in a quantity sufficient to perform a pass or epoch of training, and then proceed to upload data for the next pass or epoch.

The workflow 504, as just noted, may be performed at least partially in parallel with data ingestion 510, in order to train a machine learning model to perform anomaly detection on a time series. The training may consist of multiple passes, or epochs. In at least one embodiment, the training 520 interoperates with the data ingestion 510 to begin passes or epochs as data becomes available.

In at least one embodiment, the workflow 504 also includes an inferencing operation 522, performed using the model just trained. Similarly, or in conjunction with performing the inferencing operation 522 in the workflow 504, the inferencing operation 522 may be performed within the same container as the prior training steps. Here, container may refer to an execution unit of a workflow, orchestration component, lambda function, or other similar computational grouping. The inferencing performed by the workflow or container may be based on a portion of the time series just used to perform training. For example, 70% of a time series might be used to perform training 520, and the remaining 30% used to perform inferencing 522. Performing the inferencing as part of the same workflow or container may convey a technical advantage, in that it avoids reloading parameters of the machine learning model and/or the time series.

A workflow 506 may be executed in parallel with the workflow 504. In some cases and embodiments, the workflow 506 may also be executed in parallel with some of the workflow 502 in which data ingestion is performed.

The workflow 506 performs training operations 530 for a machine learning model that performs grouping and ranking. The machine learning model, when trained, identifies and generates anomaly groups, or correlated facts and anomalies. This can include information indicating causality and contributions related to the time series. For example, an anomaly group might include an identification of an anomalous portion of a time series, a ranking or confidence metric for the anomaly, information about other time series or data that might be correlated to or causative of the anomaly, and ranking or confidence metrics for these potential explanations of the anomaly.

The workflow 508 may begin execution following completion of the training workflows 504, 506. This can comprise an inferencing operation 540 performed using the machine learning model trained for grouping and ranking, in order to produce results that can be presented to the client. The result generation 542 portion of the workflow 508 can take the output of the inferencing operation 540 and generate a report or other user interface elements which convey to the client the anomalies detected by the system.

Although not depicted in FIG. 5, the workflows 502-508 may be followed by an additional workflow which receives confirmation from the client that continuous anomaly detection should be enabled, and if such confirmation is received, enables the continuous detection.

As one skilled in the art will appreciate in light of this disclosure, certain embodiments may be capable of achieving certain advantages, including some or all of the following. In at least one embodiment, the user is shielded from decision-making and technical dependencies related to the use of a machine learning model, due in part to the reassurance provided by back-testing capabilities. Another benefit, in some embodiments, is that the system can be adapted to perform back-testing using parallelism strategies that improve response time over systems not specifically adapted.

Figure 6:
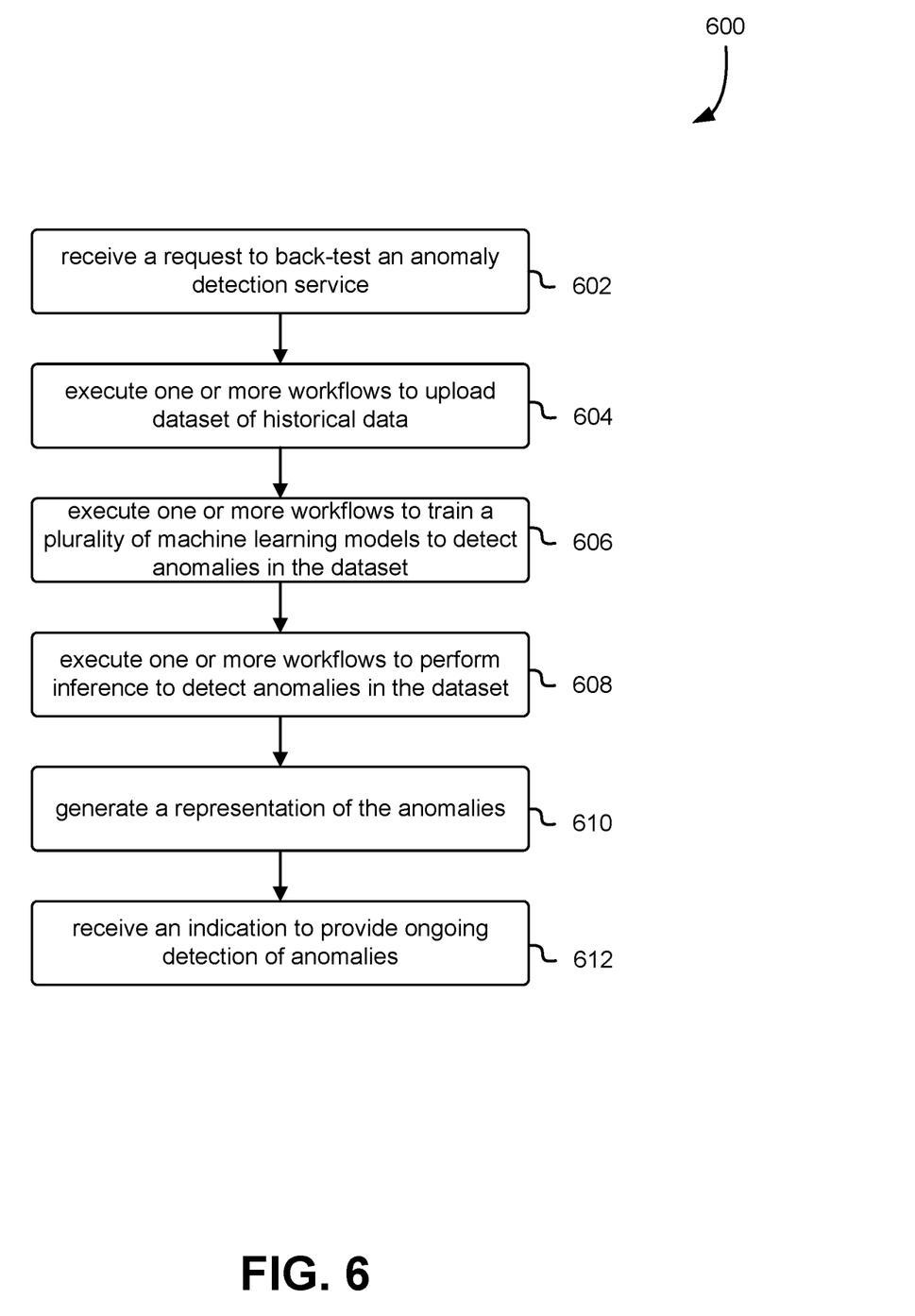
FIG. 6 illustrates an example of a process for providing anomaly prediction services with integrated back-testing, in accordance with an embodiment.

FIG. 6 illustrates an example of a process for providing anomaly prediction services with integrated back-testing, in accordance with an embodiment. Although the example 400 of FIG. 4 is depicted as a series of steps or operations, it will be appreciated that embodiments of the depicted procedure may include altered or reordered steps or operations, or may omit certain steps or operations, except where explicitly noted or logically required, such as when the output of one step or operation is used as input for another.

At 602, the anomaly detection service receives a request to back-test an anomaly detection service. For example, in at least one embodiment, a system to provide anomaly detection services comprises at least one processor and a memory that stores instructions that, when executed, cause the system to receive, from a client, a request for a service to provide continuous detection of anomalies in data to be provided by the client, the request comprising a dataset of historical data and an indication to use the dataset of historical data to back-test the service prior to initiating the continuous detection of anomalies.

At 604, the anomaly detection service executes one or more workflows to upload a dataset of historical data. For example, the aforementioned system may comprise further instructions, stored in the memory, that when executed cause the system to execute one or more workflows to upload the dataset of historical data.

At 606, the anomaly detection service executes on or more workflows to train a plurality of machine learning models to detect anomalies in a dataset. For example, the aforementioned system may comprise further instructions, stored in the memory, that when executed cause the system to execute one or more workflows to train a plurality of machine learning models to perform anomaly detection, where the training is based at least in part on a first portion of the dataset of historical data.

The plurality of machine learning models includes at least one machine learning model to perform anomaly detection on a time series. This is sometimes referred to as performing point anomaly detection, or performing outlier detection.

The plurality of machine learning models also includes at least one machine learning model to correlate anomalies identified by others of the plurality of machine learning models. Here, correlation refers to relating the various anomalies that may have been detected, as well as facts, conditions, or observations identified by the other machine learning models. For example, the system might determine that two time series exhibit related behavior, or that a pattern in one time series appears to be causative or correlated to a pattern in another.

At 608, the anomaly detection service executes one or more workflows to perform inference to detect anomalies in the dataset. For example, the aforementioned system may comprise further instructions, stored in the memory, that when executed cause the system to execute one or more workflows to detect one or more anomalies in the dataset of historical data using the plurality of machine learning models, where the anomaly detection is based at least in part on a second portion of the dataset of historical data.

The aforementioned workflows, including those to upload data, train the plurality of machine learning models, and perform inference, may be combined in various ways, according to various embodiments. For example, embodiments may assign the operations to workflows as discussed in relation to FIG. 3.

In some embodiments, the workflows may execute in parallel, using for example the techniques described in relation to FIG. 5. This can include training machine learning models in parallel. For example, the aforementioned system may comprise further instructions, stored in the memory, that when executed cause the system to train first and second machine learning models in parallel, where the first machine learning model is trained to detect anomalies, and the second is trained to perform grouping and ranking, which can sometimes be referred to as correlation.

At 610, the anomaly detection service generates a representation of the anomalies. For example, the aforementioned system may comprise further instructions, stored in the memory, that when executed cause the system to provide, to the client, a representation of the one or more anomalies detected by the one or more machine learning models.

At 612, the anomaly detection service receives an indication to provide ongoing detection of anomalies. For example, the aforementioned system may comprise further instructions, stored in the memory, that when executed cause the system to receive, from the client in response to the representation, an indication to provide the continuous detection of anomalies.

Note that the algorithms for selecting and training the plurality of machine learning models during back testing back-testing are equivalent to those used for performing continuous anomaly detection. This is done so that the back-testing can provide the user with confidence that the service as a whole, rather than only a particular machine learning model, will function according to the user's expectation. Further, the configuration of the service, when providing continuous detection of anomalies, is based at least in part on configuration of the service to perform back-testing. This is done so that the user can be confident that the results produced during ongoing testing will be similar to those generated during back-testing.

Figure 7:
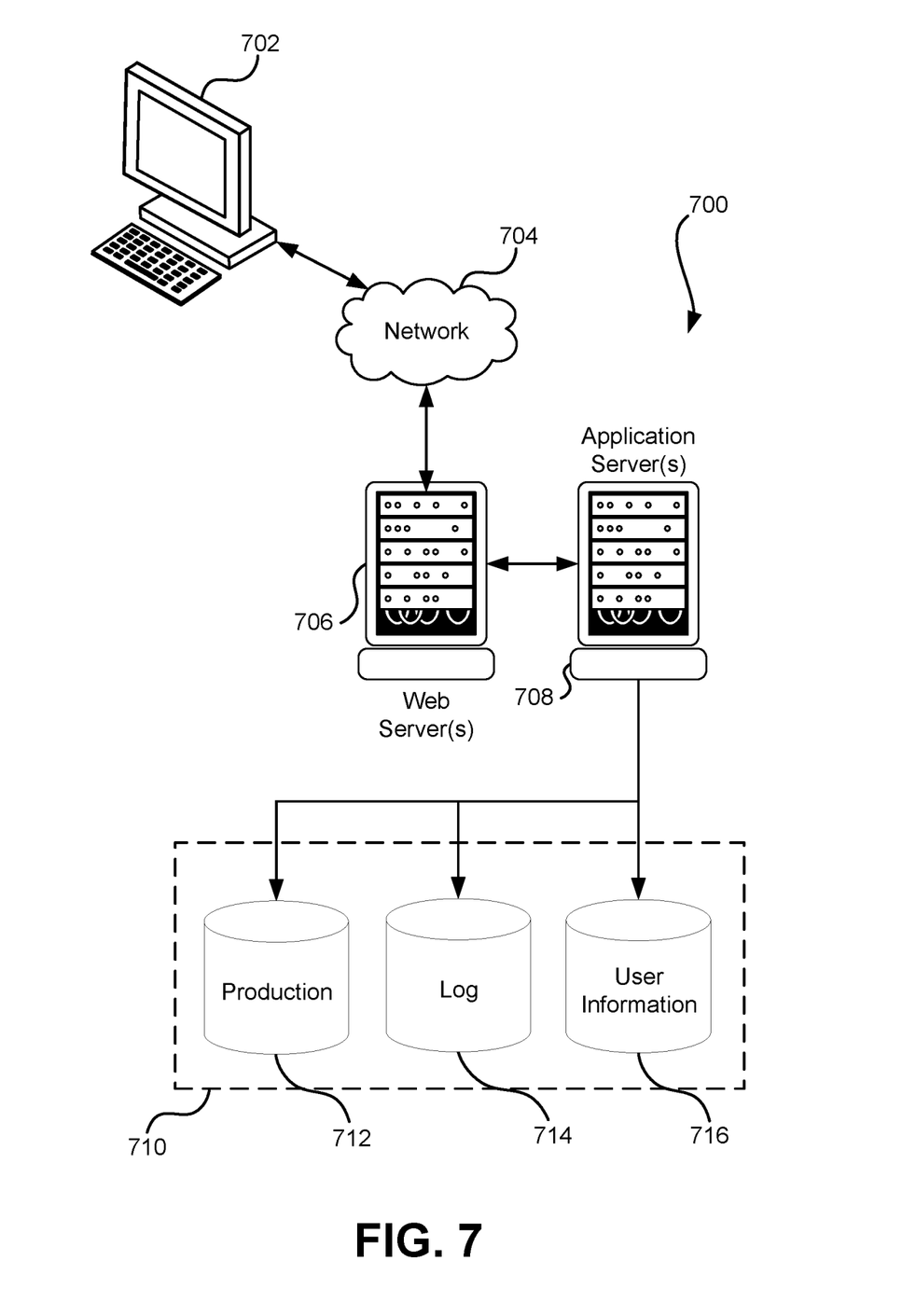
FIG. 7 illustrates a system in which various embodiments can be implemented.

FIG. 7 illustrates aspects of an example system 700 for implementing aspects in accordance with an embodiment. As will be appreciated, although a web-based system is used for purposes of explanation, different systems may be used, as appropriate, to implement various embodiments. In an embodiment, the system includes an electronic client device 702, which includes any appropriate device operable to send and/or receive requests, messages, or information over an appropriate network 704 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 706 for receiving requests and serving content in response thereto, although for other networks an alternative device serving a similar purpose could be used as would be apparent to one of ordinary skill in the art.

In an embodiment, the illustrative system includes at least one application server 708 and a data store 710, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 702 and the application server 708, in an embodiment, is handled by the web server using PUP: Hypertext Preprocessor ("PUP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 710, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 712 and user information 716, which are used to serve content for the production side. The data store also is shown to include a mechanism for storing log data 714, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 710.

The data store 710, in an embodiment, is operable, through logic associated therewith, to receive instructions from the application server 708 and obtain, update or otherwise process data in response thereto, and the application server 708 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 702. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 700 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 700, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PUP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A system, comprising:
   at least one processor; and
   memory that stores computer-executable instructions that, in response to execution by the at least one processor, cause the system to at least:
   receive, from a client, a request for a service to provide ongoing detection of anomalies in real-time data, the request comprising a dataset of historical data and an indication to use the dataset of historical data to back-test the service prior to initiating the ongoing detection of anomalies;
   execute one or more workflows to upload the dataset of historical data, train a plurality of machine learning models to perform anomaly detection, and detect one or more anomalies in the dataset of historical data using the plurality of machine learning models, wherein the training is based at least in part on a first portion of the dataset of historical data, and wherein the anomaly detection is based at least in part on a second portion of the dataset of historical data;
   provide, to the client, a representation of the one or more anomalies detected in the dataset of historical data by the plurality of machine learning models; and
   receive, from the client in response to accepting the representation, an indication to provide the ongoing detection of anomalies in the real-time data using the plurality of machine learning models.

2. The system of claim 1, wherein the plurality of machine learning models comprises at least one machine learning model trained to perform at least one of grouping, ranking, correlation, or causality analysis based, at least in part, on output from others of the plurality of machine learning models.

3. The system of claim 1, wherein at least a first and second machine learning model, of the plurality of machine learning models, are trained in parallel.

4. The system of claim 1, wherein one or more algorithms for selecting and training the plurality of machine learning models for back-testing are equivalent to those used for performing ongoing anomaly detection.

5. The system of claim 1, wherein configuration of the service to provide ongoing detection of anomalies is based at least in part on configuration of the service to perform back-testing.

6. A method, comprising:
   receiving, from a client, a request indicative of back-testing a service to provide detection of anomalies in real time data, the request indicating a dataset of historical data;
   executing one or more workflows to upload a dataset of historical data, train a plurality of machine learning models to perform anomaly detection, and detect anomalies in the dataset of historical data using the plurality of machine learning models, wherein the training is based at least in part on a first portion of the dataset of historical data, and wherein the detection is based at least in part on a second portion of the dataset of historical data;
   generating a representation of the one or more anomalies detected in the dataset of historical data by the plurality of machine learning models; and
   receiving, from the client in response to accepting the representation, an indication to activate the service to provide ongoing detection of anomalies in the real-time data using the plurality of machine learning models.

7. The method of claim 6, wherein the plurality of machine learning models comprise at least one machine learning model to correlate anomalies detected by others of the plurality of machine learning models.

8. The method of claim 6, further comprising:
   training, in at least one of a container or workflow, one of the plurality of machine learning models; and
   using, in the at least one of the container or workflow, the one of the plurality of machine learning models to identify anomalies in the dataset of historical data.

9. The method of claim 6, further comprising training at least some of the plurality of machine learning models in parallel.

10. The method of claim 6, wherein back-testing tests one or more algorithms for selecting and training the plurality of machine learning models.

11. The method of claim 6, further comprising:
    including, in a user interface provided to a client, a request to confirm that configuration of the service used to perform back-testing should also be used to configure the service to provide continuous detection of anomalies.

12. The method of claim 6, wherein the representation requests confirmation that ongoing detection of anomalies should be activated.

13. The method of claim 6, wherein a first one of the one or more workflows is dedicated to ingesting data from the dataset of historical data, and a second one of the one or more workflows initiates training of one of the plurality of machine learning models in response to a determination that a sufficient quantity of data has been ingested.

14. A non-transitory computer-readable storage medium storing thereon executable instructions that, as a result of being executed by one or more processors of a computer system, cause the computer system to at least:
    receive, from a client, a request to perform back-testing of a service to provide detection of anomalies in real-time data, the request indicating a dataset of historical data;
    initiate execution of one or more workflows to upload a dataset of historical data, train a plurality of machine learning models to perform anomaly detection, and detect anomalies in the dataset of historical data using the plurality of machine learning models, wherein the training is based at least in part on a first portion of the dataset of historical data, and wherein the detection is based at least in part on a second portion of the dataset of historical data;

cause generation of a representation of the one or more anomalies detected in the dataset of historical data by the plurality of machine learning models; and receive, from the client in response to accepting the representation, an indication to activate the service to provide ongoing detection of anomalies in the real-time data using the plurality of machine learning models.

15. The non-transitory computer-readable storage medium of claim 14, wherein the plurality of machine learning models comprise at least one machine learning model to correlate anomalies detected by others of the plurality of machine learning models.

16. The non-transitory computer-readable storage medium of claim 14, wherein the one or more workflows comprises a workflow to train one of the plurality of machine learning models and use the one of the plurality of machine learning models to identify anomalies in the dataset of historical data.

17. The non-transitory computer-readable storage medium of claim 14, wherein one or more algorithms for selecting and training the plurality of machine learning models for back-testing are equivalent to those used for performing continuous anomaly detection.

18. The non-transitory computer-readable storage medium of claim 14, wherein the instructions further comprise instructions that, as a result of being executed by the one or more processors, cause the computer system to:

including, in a user interface provided to a client, a request to confirm that configuration of the service used to perform back-testing should also be used to configure the service to provide continuous detection of anomalies.

19. The non-transitory computer-readable storage medium of claim 14, wherein the representation requests confirmation that ongoing detection of anomalies should be activated.

20. The non-transitory computer-readable storage medium of claim 14, wherein a first one of the one or more workflows is dedicated to ingesting data from the dataset of historical data, and a second one of the one or more workflows initiates training of one of the plurality of machine learning models in response to a determination that a sufficient quantity of data has been ingested.

* * * * *